US008473665B2

United States Patent
Tang et al.

(10) Patent No.: US 8,473,665 B2
(45) Date of Patent: Jun. 25, 2013

(54) UNIVERSAL SERIAL BUS (USB) TRANSACTION TRANSLATOR AND A UNIVERSAL SERIAL BUS (USB) ISOCHRONOUS-IN TRANSACTION METHOD

(75) Inventors: Jinkuan Tang, Beijing (CN); Jiin Lai, Taipei (TW); Buheng Xu, Beijing (CN); Hui Jiang, Beijing (CN)

(73) Assignee: Via Technologies, Inc., Taipei (TW)

( * ) Notice: Subject to any disclaimer, the term of this patent is extended or adjusted under 35 U.S.C. 154(b) by 221 days.

(21) Appl. No.: 12/959,261

(22) Filed: Dec. 2, 2010

(65) Prior Publication Data
US 2012/0084485 A1  Apr. 5, 2012

(30) Foreign Application Priority Data
Sep. 30, 2010 (CN) .......................... 2010 1 0512030

(51) Int. Cl.
*G06F 13/20* (2006.01)
*G06F 13/38* (2006.01)

(52) U.S. Cl.
CPC .................................... *G06F 13/385* (2013.01)
USPC ............................. 710/313; 710/310; 710/306

(58) Field of Classification Search
USPC ...................................... 710/300–317, 52–57
See application file for complete search history.

(56) References Cited

U.S. PATENT DOCUMENTS

| | | | | |
|---|---|---|---|---|
| 6,256,687 | B1 * | 7/2001 | Ellis et al. | 710/71 |
| 6,816,929 | B2 * | 11/2004 | Ueda | 710/56 |
| 6,842,611 | B2 * | 1/2005 | Beck et al. | 455/414.1 |
| 7,996,586 | B2 * | 8/2011 | Liu | 710/36 |
| 8,001,296 | B2 * | 8/2011 | Saito | 710/56 |
| 2003/0223486 | A1 * | 12/2003 | Hsu | 375/224 |
| 2006/0095642 | A1 * | 5/2006 | Hesse et al. | 710/313 |
| 2006/0149870 | A1 * | 7/2006 | Sears et al. | 710/71 |
| 2006/0195625 | A1 * | 8/2006 | Hesse | 710/8 |
| 2009/0240851 | A1 * | 9/2009 | Saito | 710/56 |
| 2010/0023649 | A1 * | 1/2010 | Choi et al. | 710/14 |
| 2010/0049880 | A1 * | 2/2010 | Santhanam et al. | 710/15 |
| 2010/0169511 | A1 * | 7/2010 | Dunstan et al. | 710/16 |
| 2011/0119557 | A1 * | 5/2011 | Chen et al. | 714/758 |
| 2011/0131356 | A1 * | 6/2011 | Devam et al. | 710/105 |
| 2011/0191503 | A1 * | 8/2011 | Kakish | 710/15 |
| 2011/0219163 | A1 * | 9/2011 | Beadnell et al. | 710/315 |

OTHER PUBLICATIONS

U.S. Appl. No. 12/959,277, filed Dec. 2, 2010.
U.S. Appl. No. 12/959,299, filed Dec. 2, 2010.
U.S. Appl. No. 12/862,134, filed Aug. 24, 2010.

* cited by examiner

*Primary Examiner* — Raymond Phan
(74) *Attorney, Agent, or Firm* — Stout, Uxa, Buyan & Mullins, LLP

(57) ABSTRACT

The present invention is directed to a universal serial bus (USB) transaction translator and an associated IN isochronous transaction method. A device interface is coupled to a device via a device bus, and a host interface is coupled to a host via a host bus, wherein the host USB version is higher than the device USB version. At least two buffers configured to store data are disposed between the device interface and the host interface. A controller stores the data in the buffers alternately. A register is used to record device bus information. Before the host sends an IN packet, the controller pre-fetches data from the device according to the device bus information and then stores the data in the buffers; the controller responds with the pre-fetched data to the host after the host sends the IN packet.

14 Claims, 4 Drawing Sheets

US 8,473,665 B2

UNIVERSAL SERIAL BUS (USB) TRANSACTION TRANSLATOR AND A UNIVERSAL SERIAL BUS (USB) ISOCHRONOUS-IN TRANSACTION METHOD

CROSS-REFERENCE TO RELATED APPLICATIONS

The entire contents of China Patent Application No. 201010512030.2, filed on Sep. 30, 2010, from which this application claims priority, are incorporated herein by reference.

BACKGROUND OF THE INVENTION

1. Field of the Invention

The present invention generally relates to Universal Serial Bus (USB), and more particularly to a USB 3.0 transaction translator (U3TT) and an associated isochronous-IN transaction method.

2. Description of Related Art

Universal Serial Bus (USB) is a specification of peripheral devices to establish communication between the devices and a host. USB 3.0 was released in 2008, and a USB 3.0 cable is shown in FIG. 1A. In addition to a signal pair D+/D− for USB 2.0 data path, two signal pairs SSTX+/SSTX− and SSRX+/SSRX− are further provided for USB 3.0 SuperSpeed data path.

When a USB 2.0 device is coupled to a USB 3.0 host, communication is performed over the non-SuperSpeed data path D+/D−. The applicant of the present invention discloses a USB 3.0 transaction translator (U3TT) in China Patent Application No. 201010129143.4, the disclosure of which is hereby incorporated by reference. The U3TT 10 as shown in FIG. 1B is coupled between the USB 3.0 host 12 and the USB 2.0 device 14, and is utilized to upgrade the USB 2.0 device to act as a quasi-USB 3.0 device such that data transfer speed can be improved.

USB provides four information transfer types: control transfer, bulk transfer, interrupt transfer and isochronous transfer, among which the isochronous transfer type reserves sufficient bandwidth with guaranteed transfer speed and is commonly used in audio or video data transfer. However, as the isochronous transfer type will not correct errors or retry packets, it cannot guarantee the correctness of transferred data.

FIG. 2 shows a flow diagram of isochronous-IN transaction using the U3TT. In step 21, the USB 3.0 host sends an IN acknowledge packet to the U3TT. Subsequently, in step 22, the U3TT translates the USB 3.0 IN acknowledge packet into a USB 2.0 IN token packet, and then sends the USB 2.0 IN token packet to the USB 2.0 device via a serial interface engine (SIE). Afterwards, in step 23, when the USB device is ready to send data, the USB 2.0 device responds to the U3TT with the USB 2.0 data in step 23. Finally, in step 24, the U3TT translates the USB 2.0 data into USB 3.0 data, and then sends the translated USB 3.0 data to the USB 3.0 host. According to the flow described above, the device will not respond to the host with data until the host sends an IN packet to the device.

One disadvantage of the above flow is that the host and the device stay in an idle state during a period from the device receives an IN packet until the device are ready to send data, therefore wasting the waiting time and bus bandwidth. Another disadvantage of the above flow is that the host will cancel the isochronous-IN transaction if the idle period of the device exceeds a predefined value.

In order to overcome the disadvantages mentioned above, a need has arisen to propose an improved U3TT and a novel isochronous-IN transaction method to reduce idle period and improve USB 2.0 bandwidth usage.

SUMMARY OF THE INVENTION

In view of the foregoing, it is an object of the embodiment of the present invention to provide a USB 3.0 transaction translator (U3TT) and an isochronous-IN transaction method, which are capable of effectively reducing idle period of a host and devices, and substantially improving the usage of USB 2.0 bandwidth.

According to one embodiment, a Universal Serial Bus (USB) transaction translator includes a device interface, a host interface, at least two buffers, a controller and a register. The device interface is coupled to a device via a device bus; the host interface is coupled to a host via a host bus, wherein the host has a USB version higher than the USB version of the device. The buffers are configured to store data, and are disposed between the device interface and the host interface. The controller is configured to store the data in the buffers alternately. The register is configured to record device bus information. Before the host sends an IN packet, the controller pre-fetches the data from the device according to the device bus information and then stores the data in the buffer; and the controller responds to the host with the pre-fetched data after the host sends the IN packet.

According to an isochronous-IN transaction method disclosed in another embodiment, a host configures a device through a transaction translator, wherein the host has a USB version higher than the USB version of the device. Device bus information associated with the device is recorded in the transaction translator. Subsequently, the transaction translator sends an IN token packet to the device according to the device bus information. The device responds to the transaction translator with data, which are alternately stored in at least two buffers. The transaction translator responds to the host with the data stored in the buffers when the host sends an IN acknowledge packet to the transaction translator.

DETAILED DESCRIPTION OF THE INVENTION

Figure 1A:
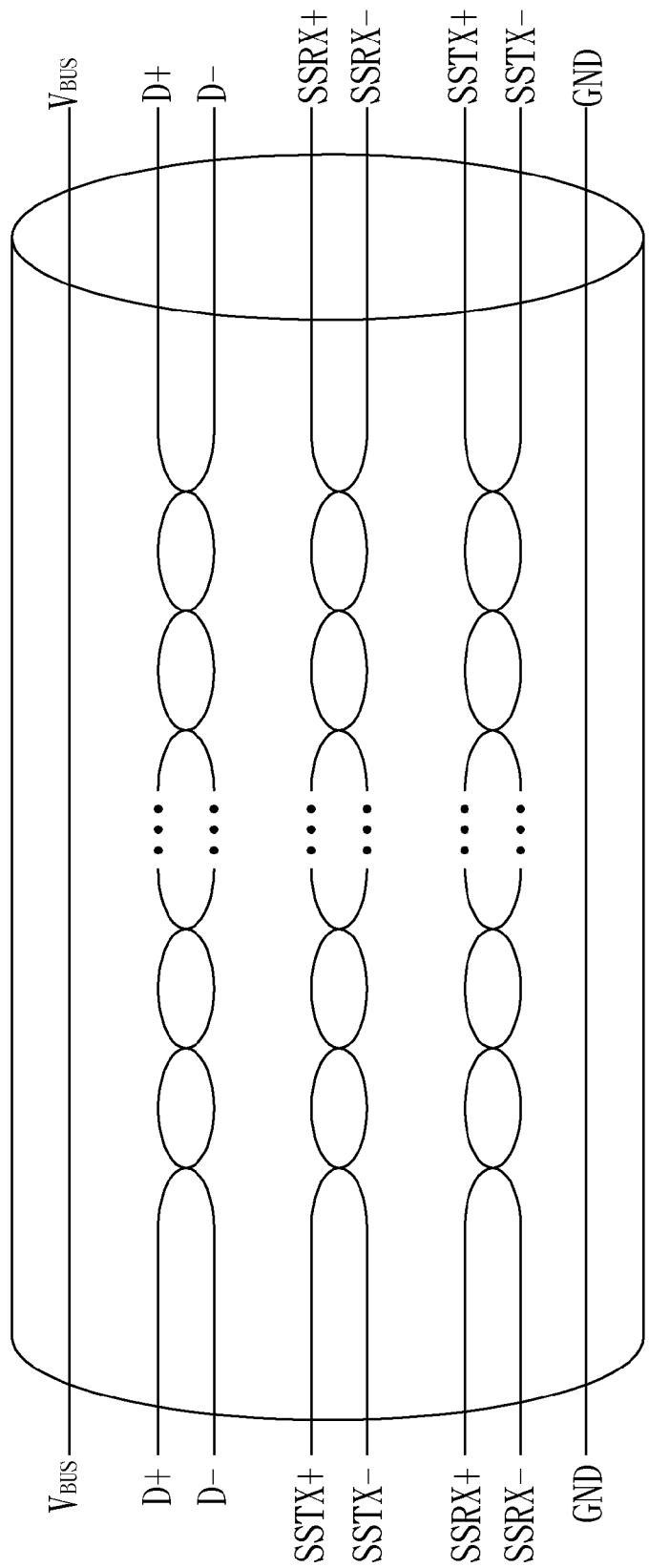
FIG. 1A shows a conventional USB 3.0 cable.
Figure 1B:
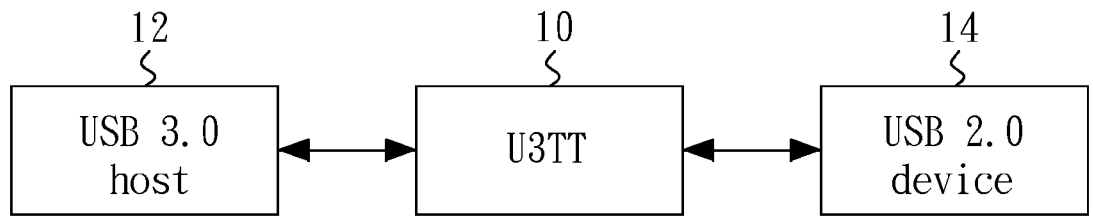
FIG. 1B shows a block diagram illustrating a conventional U3TT coupled between a USB 3.0 host and a USB 2.0 device.
Figure 2:
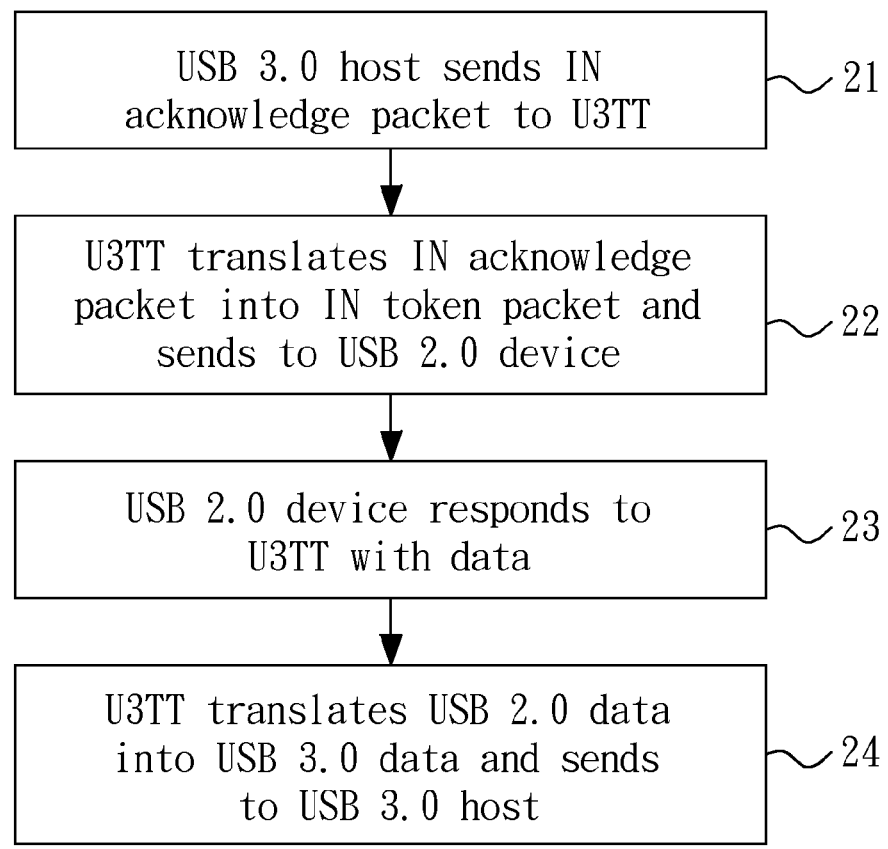
FIG. 2 shows a flow diagram of isochronous-IN transaction using the conventional U3TT.
Figure 3:
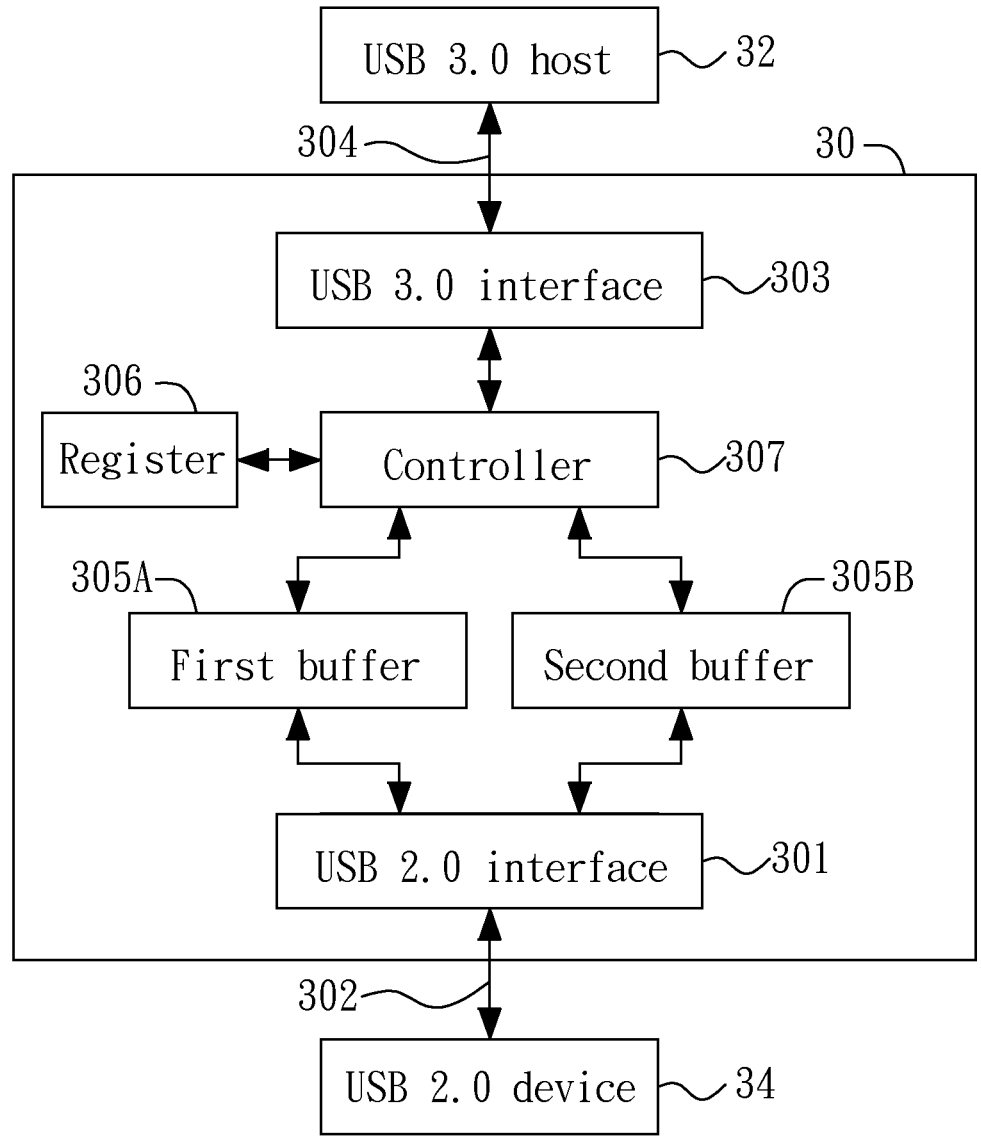
FIG. 3 shows a block diagram illustrated of a USB 3.0 transaction translator (U3TT) to establish translation between a USB 3.0 host and a USB 2.0 device according to one embodiment of the present invention.

FIG. 3 shows a block diagram illustrated of a Universal Serial Bus (USB) 3.0 transaction translator (U3TT) 30 to establish translation between a USB 3.0 host 32 and a USB 2.0 device 34 according to one embodiment of the present invention. The configuration of the constituent blocks of the U3TT 30 is not limited to that shown in FIG. 3. Although the USB 3.0 transaction translator 30 is demonstrated here, the present invention, however, may be adapted to a higher USB version. The U3TT 30 as shown in FIG. 3 only illustrates the constituent blocks that are pertinent to the present invention, while details may be referred to the above-mentioned China patent application. Details of USB 2.0 and USB 3.0 may be referred to "Universal Serial Bus Specification" and "Universal Serial Bus 3.0 Specification" respectively, the disclosures of which are hereby incorporated by reference.

In the embodiment, the U3TT 30 includes a USB 2.0 interface (or "device interface") 301, which is coupled to the device 34 via a USB 2.0 bus (or "device bus") 302 that is used as a signal interface between the U3TT 30 and the device 34. The U3TT 30 also includes a USB 3.0 interface (or "host interface") 303, which is coupled to the host 32 via a USB 3.0 bus (or "host bus") 304 that is used as a signal interface between the U3TT 30 and the host 32. The USB 2.0 interface 301 or the USB 3.0 interface 303 may include a serial interface engine (SIE), which is used to serialize or deserialize data transferred over the USB 2.0 bus 302 or the USB 3.0 bus 304.

According to one aspect of the present embodiment, the U3TT 30 includes two buffers: a first buffer 305A and a second buffer 305B, disposed between the USB 2.0 interface 301 and the USB 3.0 interface 303, for storing data. A controller 307 controllably stores data, for example, in the first buffer 305A, and afterwards stores further data in the second buffer 305B when the first buffer 305A is full. The buffers 305A and 305B that are alternately operated may be called ping-pong buffers. Although two buffers 305A and 305B are demonstrated in the embodiment, a multiple buffering using three or more buffers may generally be applied. Moreover, the first buffer 305A and the second buffer 305B may have different size according to specific applications.

The U3TT 30 may further include a register 306, which is used to record information such as (device addressable) endpoint number or bandwidth requirement of the USB 2.0 bus 302. The controller 307 of the U3TT 30 not only performs translation but also operates and coordinates the other blocks mentioned above.

Figure 4:
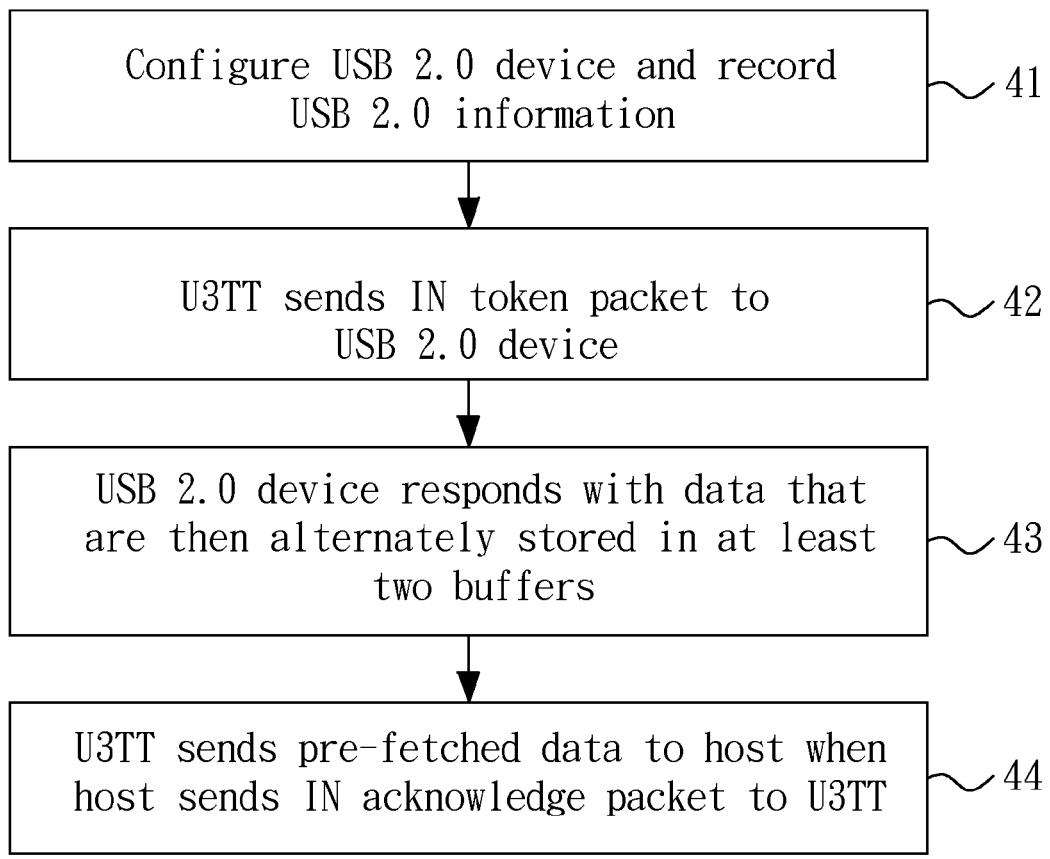
FIG. 4 shows a flow diagram illustrated of an isochronous-IN transaction method according to one embodiment of the present invention.

FIG. 4 shows a flow diagram illustrated of an isochronous-IN transaction method according to one embodiment of the present invention. In step 41, the USB 3.0 host 32 and the U3TT 30 configure or emulate the USB 2.0 device 34 (i.e., upgrade the USB 2.0 device 34 as a quasi-USB 3.0 device), and record the information (e.g., endpoint number or bandwidth requirement) of the USB 2.0 bus 302 in the register 306.

Subsequently, in step 42, after establishing a pipe between the device 34 and the U3TT 30, the U3TT 30 sends an IN token packet to the device 34 according to the bandwidth requirement of the device 34 regardless of receiving IN acknowledge packet from the host 32 or not. In the embodiment, the U3TT 30 sends the IN token packet every frame time (which is 1 m second when the device 34 is at full speed or low speed) or every micro-frame time (which is 125µ second when the device 34 is at high speed).

In step 43, the device 34 responds to the U3TT 30 with data. The data from the device 34 are alternately stored in the first buffer 305A and the second buffer 305B by the controller 307. For example, the data are stored in the second buffer 305B when the first buffer 305A is full; and further data are stored in the first buffer 305A when the second buffer 305B is full, even if the data in the first buffer 305A have not been retrieved. As the isochronous transfer type guarantees transfer speed but not correctness of the transferred data, the data overwriting in the buffers 305A and 305B still complies with the isochronous transfer.

In step 44, when the host 32 sends an IN acknowledge packet to the U3TT 30, the U3TT 30 directly sends the pre-fetched data in the buffers 305A and 305B to the host 32. Specifically, the controller 307 monitors status of the buffers 305A and 305B to determine what portion of the data should be transferred to the host 32. For example, when the first buffer 305A is writing data, the data in the second buffer 305B are determined as valid data to be sent to the host 32; on the other hand, when the second buffer 305B is writing data, the data in the first buffer 305A are determined as valid data to be sent to the host 32.

The data may be stored in the buffers 305A and 305B according to USB 2.0 specification, and are then translated, i.e., from USB 2.0 to USB 3.0, when reading the data. On the other hand, the data may be translated before they are stored in the buffers 305A and 305B, and may be directly transferred when reading the data. For example, if the SIE mentioned above is disposed in the USB 2.0 interface 301, the data are directly stored and are then subjected to translation when reading the data; otherwise, if the SIE is disposed in the USB 3.0 interface 303, the data are translated before being stored.

Although specific embodiments have been illustrated and described, it will be appreciated by those skilled in the art that various modifications may be made without departing from the scope of the present invention, which is intended to be limited solely by the appended claims.

What is claimed is:

1. A Universal Serial Bus (USB) transaction translator, comprising:
    a device interface coupled to a device via a device bus;
    a host interface coupled to a host via a host bus, wherein the host has a USB version higher than the USB version of the device;
    at least two buffers configured to store data, the buffers being disposed between the device interface and the host interface;
    a controller configured to store the data in the buffers alternately; and
    a register configured to record device bus information;
    wherein, before the host sends an IN packet, the controller pre-fetches the data from the device according to the device bus information recorded in the register and then stores the data in the buffer; and the controller responds to the host with the pre-fetched data after the host sends the IN packet.

2. The USB transaction translator of claim 1, wherein the USB version of the host is USB 3.0, and the USB version of the device is USB 2.0.

3. The USB transaction translator of claim 1, wherein the host interface or the device interface comprises a serial interface engine (SIE) configured to serialize or deserialize the data transferred over the corresponding host bus or the device bus.

4. The USB transaction translator of claim 1, wherein the at least two buffers comprise a first buffer and a second buffer, wherein the controller stores the data in the first buffer, and then stores the data in the second buffer when the first buffer is full.

5. The USB transaction translator of claim 1, wherein the device bus information comprises an endpoint number or bandwidth requirement.

6. The USB transaction translator of claim 4, wherein the controller monitors status of the first buffer and the second buffer, wherein the controller determines the data in the second buffer as valid data when the first buffer is writing data; and the controller determines the data in the first buffer as the valid data when the second buffer is writing data.

7. A Universal Serial Bus (USB) isochronous-IN transaction method, comprising:

configuring a device by a host through a transaction translator, wherein the host has a USB version higher than the USB version of the device;

recording device bus information associated with the device in the transaction translator;

sending an IN token packet to the device by the transaction translator according to the device bus information recorded in the transaction translator;

the device responding to the transaction translator with data;

alternately storing the data from the device in at least two buffers; and the transaction translator responding to the host with the data stored in the buffers when the host sends an IN acknowledge packet to the transaction translator.

8. The method of claim 7, wherein the device bus information comprises an endpoint number or bandwidth requirement.

9. The method of claim 7, wherein the IN token packet is sent to the device every frame time, which is 1m second when the device is at full speed or low speed.

10. The method of claim 7, wherein the IN token packet is sent to the device every micro-frame time, which is 125μ second when the device is at high speed.

11. The method of claim 7, wherein the at least two buffers comprise a first buffer and a second buffer, wherein the data are stored in the first buffer, and are then stored in the second buffer when the first buffer is full.

12. The method of claim 7, before alternately storing the data in the at least two buffers, further comprising a step of translating the data by the transaction translator.

13. The method of claim 7, after alternately storing the data in the at least two buffers but before responding to the host with the data, further comprising a step of translating the data by the transaction translator.

14. The method of claim 11, wherein the transaction translator monitors status of the first buffer and the second buffer, wherein the data in the second buffer are determined as valid data when the first buffer is writing data; and the data in the first buffer are determined as the valid data when the second buffer is writing data.

* * * * *